(12) United States Patent
Jung

(10) Patent No.: US 10,776,952 B2
(45) Date of Patent: Sep. 15, 2020

(54) IMAGE-RECORDING AND TARGET-COUNTING DEVICE

(71) Applicants: INVENTEC (PUDONG) TECHNOLOGY CORPORATION, Shanghai (CN); INVENTEC CORPORATION, Taipei (TW)

(72) Inventor: Jiun-Kuei Jung, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 247 days.

(21) Appl. No.: 15/976,743

(22) Filed: May 10, 2018

(65) Prior Publication Data

US 2019/0156514 A1    May 23, 2019

(30) Foreign Application Priority Data

Nov. 17, 2017 (CN) .......................... 2017 1 1142919

(51) Int. Cl.
| | |
|---|---|
| *G06T 7/73* | (2017.01) |
| *H04N 5/232* | (2006.01) |
| *G06N 5/04* | (2006.01) |
| *G06T 7/00* | (2017.01) |

(52) U.S. Cl.
CPC .............. *G06T 7/75* (2017.01); *G06N 5/046* (2013.01); *G06T 7/97* (2017.01); *H04N 5/23296* (2013.01); *H04N 5/23299* (2018.08); *G06T 2207/30242* (2013.01)

(58) Field of Classification Search
CPC .... G06T 7/75; G06T 7/97; G06T 7/20; G06T 7/254; G06T 7/73; G06T 2207/10016; G06T 2207/30196; G06T 2207/30232; G06T 2207/30201; G06T 2207/20021; G06T 2207/30242; H04N 5/23299; H04N 5/23296; H04N 7/18; H04N 7/181; H04N 7/188; G06N 5/046; G06K 9/00771; G06K 9/00295; G06K 9/00228; G06K 9/00288; G06K 9/00335; G06K 9/00369; G06K 9/00711; G06K 9/6267; G06K 9/00268;

(Continued)

(56) References Cited

U.S. PATENT DOCUMENTS

| | | | | |
|---|---|---|---|---|
| 9,158,975 B2* | 10/2015 | Lipton | ............... | G06K 9/00771 |
| 9,760,808 B2* | 9/2017 | Fujii | ........................ | H04N 7/18 |
| 9,906,722 B1* | 2/2018 | Gigot | ................. | H04N 5/23241 |

(Continued)

*Primary Examiner* — Michael S Osinski
(74) *Attorney, Agent, or Firm* — Maschoff Brennan

(57) ABSTRACT

An image-capturing and target-counting device comprises a camera, a controller and an image processor wherein the camera is electrically connected to the controller and the image processor. The controller controls the camera to perform filming to obtain a plurality of images with a first time interval as an image capturing period. The image processor obtains a plurality of estimated quantities according to a recognition model and a part of the plurality of images which is obtained in a second time interval, and obtains as well as records a determined quantity of a kind of target items existing in the filming field of the camera according to the plurality of estimated quantities, wherein the second time interval is at least twice as long as the first time interval.

9 Claims, 3 Drawing Sheets

(58) Field of Classification Search
CPC ........... G06K 9/00744; G06K 9/00778; G06K 9/00261; G06K 9/00362; G06K 9/00624
See application file for complete search history.

(56) References Cited

U.S. PATENT DOCUMENTS

| | | | | |
|---|---|---|---|---|
| 2008/0018738 A1* | 1/2008 | Lipton | ............... | G08B 13/1968 348/143 |
| 2009/0295919 A1* | 12/2009 | Chen | ............... | H04N 7/18 348/143 |
| 2013/0129144 A1* | 5/2013 | Chang | ............... | G06K 9/62 382/103 |
| 2013/0343604 A1* | 12/2013 | Adachi | ............... | G06K 9/00771 382/103 |
| 2014/0161305 A1* | 6/2014 | Lee | ............... | G06F 3/0304 382/103 |
| 2014/0161316 A1* | 6/2014 | Golan | ............... | G06K 9/00261 382/103 |
| 2015/0063640 A1* | 3/2015 | Anabuki | ............... | G06T 7/20 382/103 |
| 2015/0125032 A1* | 5/2015 | Yamanaka | ............... | G06K 9/00624 382/103 |
| 2015/0154472 A1* | 6/2015 | Yano | ............... | G06F 16/583 382/219 |
| 2015/0334523 A1* | 11/2015 | Lappetelainen | ............... | H04W 4/80 455/456.1 |
| 2016/0006988 A1* | 1/2016 | Zhao | ............... | G08B 13/19669 348/155 |
| 2016/0012280 A1* | 1/2016 | Ito | ............... | G06K 9/00268 382/305 |
| 2016/0042621 A1* | 2/2016 | Hogg | ............... | G08B 13/19615 348/155 |
| 2016/0253579 A1* | 9/2016 | Bamba | ............... | G06K 9/00771 382/103 |
| 2016/0260226 A1* | 9/2016 | Yano | ............... | G06T 7/277 |
| 2016/0261808 A1* | 9/2016 | Tojo | ............... | H04N 5/23229 |
| 2016/0261911 A1* | 9/2016 | Soundararajan | ... | G06K 9/00778 |
| 2016/0284098 A1* | 9/2016 | Okumura | ............... | H04N 5/247 |
| 2017/0053191 A1* | 2/2017 | Koyama | ............... | G06K 9/6267 |
| 2017/0061625 A1* | 3/2017 | Estrada | ............... | G06N 3/0454 |
| 2017/0083791 A1* | 3/2017 | Shiratani | ............... | G06K 9/00624 |
| 2017/0124378 A1* | 5/2017 | High | ............... | G06Q 10/06315 |
| 2017/0270375 A1* | 9/2017 | Grauer | ............... | G06K 9/6293 |
| 2017/0300569 A1* | 10/2017 | Shiiyama | ............... | G06F 16/738 |
| 2018/0018504 A1* | 1/2018 | Sotodate | ............... | G06K 9/00771 |
| 2018/0137362 A1* | 5/2018 | Danielsson | ............... | G06K 9/685 |
| 2018/0324393 A1* | 11/2018 | Ryan | ............... | G06K 9/6218 |
| 2019/0026882 A1* | 1/2019 | Liu | ............... | G06T 7/187 |
| 2019/0057249 A1* | 2/2019 | Hayase | ............... | G06F 21/32 |
| 2019/0095695 A1* | 3/2019 | Iwanami | ............... | G06K 9/00221 |
| 2019/0122082 A1* | 4/2019 | Cuban | ............... | H04N 21/251 |
| 2019/0130594 A1* | 5/2019 | Seyfi | ............... | G06K 9/6274 |
| 2019/0303657 A1* | 10/2019 | Yu | ............... | G06K 9/00228 |
| 2019/0333241 A1* | 10/2019 | Yano | ............... | G06M 7/00 |
| 2020/0110955 A1* | 4/2020 | Nakagawa | ............... | G06K 9/00744 |

* cited by examiner

IMAGE-RECORDING AND TARGET-COUNTING DEVICE

CROSS-REFERENCE TO RELATED APPLICATIONS

This non-provisional application claims priority under 35 U.S.C. § 119(a) on Patent Application No(s). 201711142919.4 filed in China on Nov. 17, 2017, the entire contents of which are hereby incorporated by reference.

BACKGROUND

Technical Field

This disclosure relates to a counting device, and more particularly to a counting device comprising a camera.

Related Art

In the management of public places such as parking lots, stores or department stores, the control of the number of visitors is an important issue for maintaining environmental quality. Therefore, counting devices are commonly disposed in these public places to count the visitors. For example, a card-type counting device may be disposed in the parking lot, provide cards to the visitors when they drive cars into the parking lot, and retrieve the cards when the cars leave the parking lot, so as to count the cars. But, in the place where the quantity of the target items is large, such as markets or department stores, the use of the card-type counting device must make the admission process redundant. Therefore, in such places, optical counting devices (e.g. infrared or light-blocking counters) are usually set at the door to count the visitors.

However, the infrared counter performs counting according to the temperature sensing result so that its sensitivity and response speed are low. The light-blocking counter adds one to the counting result whenever the beam outputted by the light-blocking counter is blocked. Therefore, when multiple people simultaneously enter the detected place through the door, the light-blocking counter must determine that only one person enters the detected place. Moreover, when non-human objects pass through the door, they must be included in the counting result so that the accuracy of the counting result of the light-blocking counter is low.

SUMMARY

This disclosure provides an image-capturing and target-counting device to obtain the quantity of a specific kind of target items by capturing images and processing these images.

According to one or more embodiments of this disclosure, an image-capturing and target-counting device comprises a camera, a controller and an image processor wherein the camera is electrically connected to the controller and the image processor. The controller controls the camera to perform filming to obtain a plurality of images with a first time interval as an image capturing period. The image processor obtains a plurality of estimated quantities according to a recognition model and a part of the plurality of images which is obtained in a second time interval, and obtains as well as records a determined quantity of a kind of target items existing in the filming field of the camera according to the plurality of estimated quantities, wherein the second time interval is at least twice as long as the first time interval.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

One or more embodiments of this disclosure provide an image-capturing and target-counting device for recognition a specific kind of target items to obtain the quantity of this kind of target items. For example, when the image-capturing and target-counting device set the human as a target item, the image-capturing and target-counting device can recognize the human and obtain the quantity of the human existing within the filming field. The pet or other kind of objects can also be set as the target item, which is not limited in this disclosure.

Figure 1:
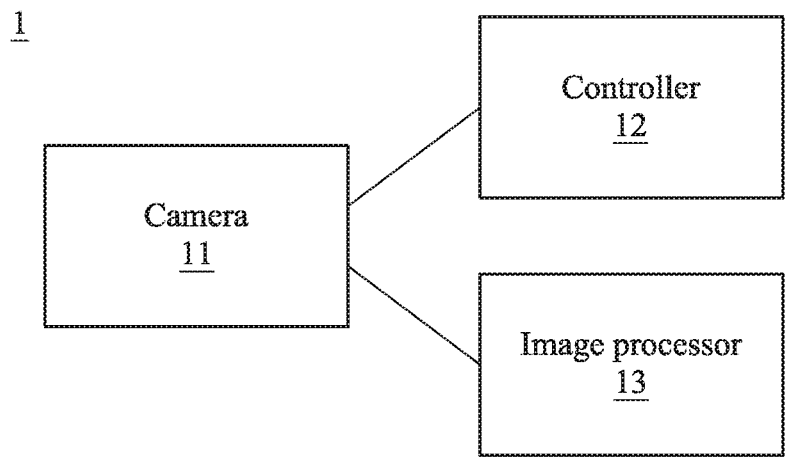
FIG. 1 is a functional block diagram of an image-capturing and target-counting device according to an embodiment of this disclosure.

Please refer to FIG. 1 for the basic structure of an image-capturing and target-counting device, wherein FIG. 1 is a function diagram of the image-capturing and target-counting device according to an embodiment of this disclosure. As shown in FIG. 1, the image-capturing and target-counting device 1 comprises a camera 11, a controller 12 and an image processor 13, wherein the camera 11 is electrically connected to the controller 12 and the image processor 13. The camera 11, such as a bullet camera, a dome camera or other type of camera, is configured to capture one or more images within the filming field. In this embodiment, the filming field and the focal length of the camera 11 have a negative correlation therebetween. In other words, for the camera 11, the shorter its focal length is, the broader its filming field is; on the contrary, the longer its focal length is, the narrower its filming field is.

The controller 12, such as a microcontroller, a programmable logic controller or other controller, controls the camera 11 to perform filming to obtain a plurality of images with a first time interval as the image capturing period. The first time interval can be the default image capturing period of the camera 11 or a time interval set by a user, and the quantity of the images obtained by the camera 11 can be the default value of the controller 12 or the value set by the user.

The image processor 13 such as a digital signal processor (DSP) includes a built-in memory. The image processor 13 obtains a plurality of estimated quantities according to a recognition model and a part of the plurality of images obtained by the camera 11 in a second time interval. More particularly, the second time interval can be the default value of the image processor 13 or the value set by the user. The second time interval is at least twice as long as the first time interval; that is, in the second time interval, the quantity of the images obtained by the camera 11 is at least 2. The image processor 13 respectively processes these images using the recognition model to obtain to the estimated quantities which respectively corresponds to the images. For example, the recognition model belongs to a convolutional neural network (CNN), a deep neural network (DNN) or another kind of models. The recognition model can be pre-installed in the memory or be set by the user.

The image processor 13 obtains and records a determined quantity of a kind of target items existing in the filming field according to these estimated quantities. For example, the image processor 13 calculates the average of the estimated quantities of the images obtained in the second time interval, and records the calculated average (i.e. calculation result) as the determined quantity of the target items in the memory. Afterwards, the image processor 13 executes the above calculation each second time interval in order to update the determined quantity of the target items. In another embodiment, the image processor 13 records all calculation results as a plurality of determined quantities with the second time interval as a recording period. Therefore, when a dynamic object such as the human or the pet is set as the target item, the frequent updates on the determined quantity or a great quantity of the records of the determined quantities due to the frequent changes in the quantity of the target items may be avoided through the above calculation executed by the image processor 13.

Figure 2:
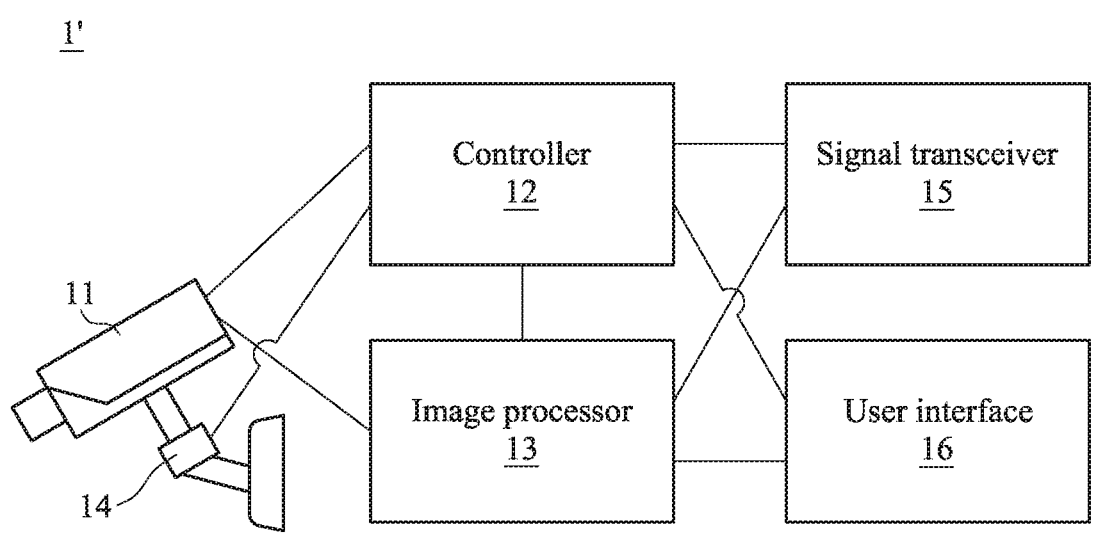
FIG. 2 is a schematic diagram of the structure of an image-capturing and target-counting device according to another embodiment of this disclosure.

Please refer to FIG. 2 which is a schematic diagram of the structure of an image-capturing and target-counting device according to another embodiment of this disclosure. In comparison with the image-capturing and target-counting device 1 as shown in FIG. 1, the image-capturing and target-counting device 1' in the embodiment of FIG. 2 similarly comprises a camera 11, a controller 12 and an image processor 13 which are similar to those of the image-capturing and target-counting device 1 in FIG. 1, so that the related details are not repeated. In this embodiment, the image-capturing and target-counting device 1' further comprises a rotary base 14 electrically connected to the controller 12 and controlled by the controller 12 to rotate. The camera 11 is disposed at the rotary base 14, rotates with the rotary base 14 to capture a plurality of sub-images respectively towards a plurality of directions, and transmits the plurality of sub-images to the image processor 13. The image processor 13 synthesizes the received sub-images according to a weighting function so to generate a composite image, wherein the composite image is one of the images as mentioned in the above embodiment (i.e. images obtained with the first time interval as the image capturing period by the camera 11 which is controlled by the controller 12). In other words, in this embodiment, the controller 12 controls the camera 11 to perform a filming procedure every first time interval wherein the filming procedure includes capturing a plurality of sub-images respectively towards a plurality of directions, and then the image processor 13 synthesize these sub-images to generate the image.

Figure 3A:
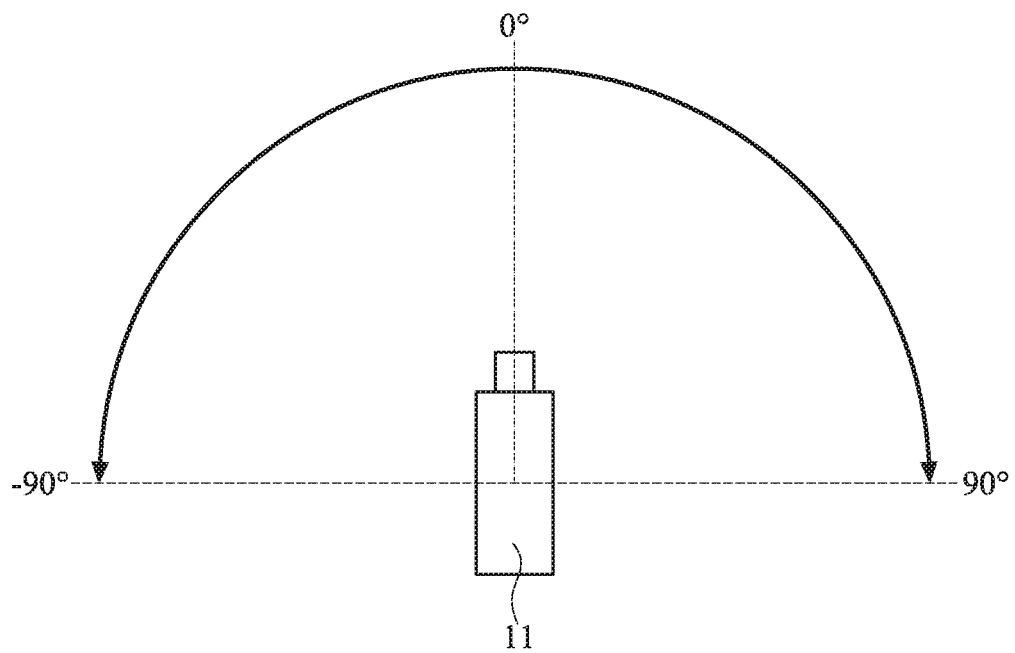
FIG. 3A is a schematic diagram of rotating angles of an image-capturing and target-counting device according to another embodiment of this disclosure.
Figure 3B:
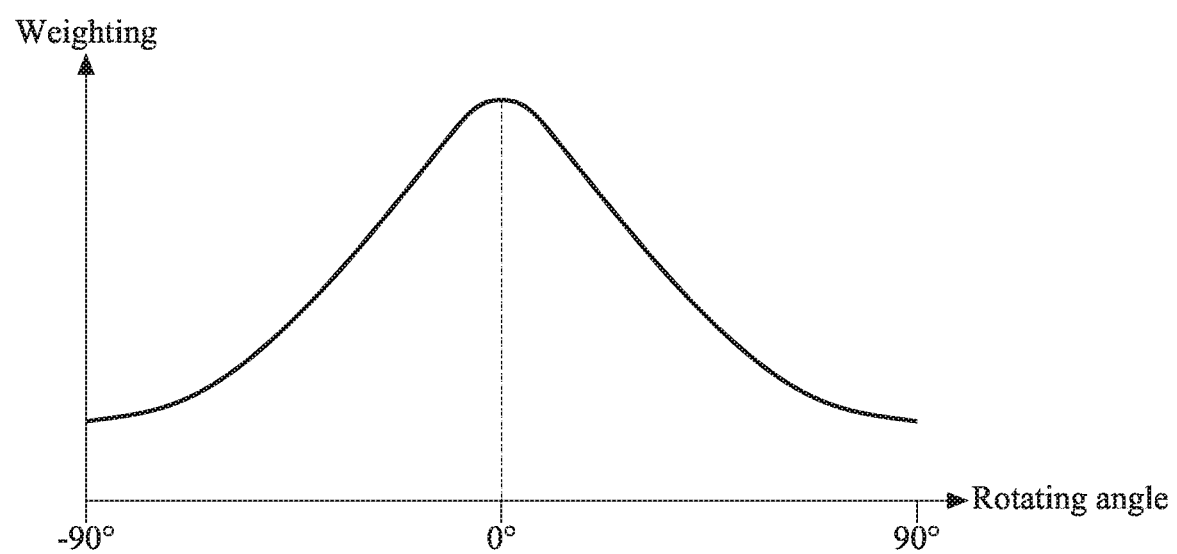
FIG. 3B is a schematic diagram of a weighting function for image processing of an image-capturing and target-counting device according to another embodiment of this disclosure.

Please refer to FIGS. 2, 3A and 3B to exemplarily explain the filming procedure as aforementioned. FIG. 3A is a schematic diagram of rotating angles of an image-capturing and target-counting device according to another embodiment of this disclosure, and FIG. 3B is a schematic diagram of a weighting function for image processing of an image-capturing and target-counting device according to another embodiment of this disclosure. As shown in FIG. 3A, when the camera 11 faces its default forward direction, its rotating angle is assumed to be 0 degree (°). The camera can rotate with the rotary base 14 in the rotating angle range between −90° and 90°. In this embodiment, the controller 12 can control the camera 11 to perform filming every preset angle within this rotating angle range (e.g. to capture a sub-image every 10° from −90° to 90°), or perform filming respectively at a plurality of rotating angles. Each rotating angle corresponds to a respective image processing weight. Generally, the camera 11 is preset to face the center of the filming environment, so that the sub-image captured by the camera 11 corresponds to the fringe of the filming environment when the camera 11 performs filming with a large rotating angle. Therefore, as shown in FIG. 3B, the weighting function for image processing can be designed to indicate a Gauss distribution for the rotating angles, in order to put emphasis on the images captured near the center of the filming environment. Moreover, the weighting function can be designed as another kind of function based on the actual requirements.

Besides the camera 11, the controller 12 and the image processor 13, the image-capturing and target-counting device 1' can further comprise a signal transceiver 15. For example, the signal transceiver 15 is a wired or wireless signal transceiver, electrically connected to the controller 12, and sends a notification signal related to the determined quantity of the target items to a network platform or a personal device such as mobile phone, tablet, personal computer, and so on. In an embodiment, the controller 12 generates a control command when the image processor 13 records the determined quantity. In other words, whenever the image-capturing and target-counting device 1' determines the quantity of the target items, it outputs the related notification signal. In another embodiment, the controller 12 is electrically connected to the image processor 13 to obtain the determined quantity of the target items, and determines whether the determined quantity is equal to or larger than a preset threshold value. When the controller 12 generates the control command for transmitting the notification signal related to the determined quantity when determining that the determined quantity is equal to or larger than the threshold value. For example, the notification signal indicates the value of the determined quantity. As another example, the notification signal indicates the relation between the determined quantity and the threshold value. This disclosure does not intend to limit the form of the notification signal.

Moreover, the image-capturing and target-counting device 1' further comprises a user interface 16. The user interface 16 is electrically connected to the controller 12 and the image processor 13, and provides an operation platform for the user to input one or more parameters of the aforementioned first time interval, the second time interval and the recognition model. The user interface 16 is also configured to generate the control command for transmitting the notification signal and to set the aforementioned weighting function. It should be noted that each of the rotary base 14, the signal transceiver 15 and the user interface 16 is a component selectively disposed in the image-capturing and target-counting device.

Figure 4:
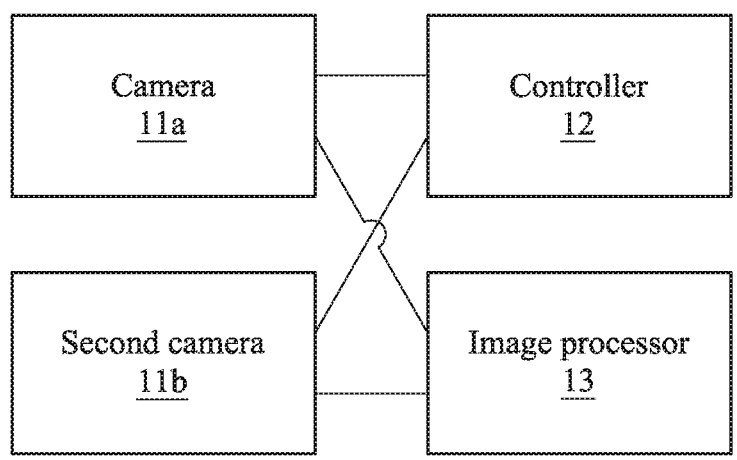
FIG. 4 is a functional block diagram of an image-capturing and target-counting device according to yet another embodiment of this disclosure.

Please refer to FIG. 4, wherein FIG. 4 is a functional block diagram of an image-capturing and target-counting device according to yet another embodiment of this disclosure. As shown in FIG. 4, the image-capturing and target-counting device 1" comprises a camera 11a, a controller 12 and an image processor 13 which are similar to those of the image-capturing and target-counting device 1 in FIG. 1, so that the related details are not repeated. Moreover, the image-capturing and target-counting device 1" further comprises a second camera 11b electrically connected to the controller 12 and the image processor 13. In this embodiment, the controller 12 controls the camera 11a to perform filming to obtain a plurality of first images with a first time interval as an image capturing period thereof, and controls the second camera 11b to perform filming to obtain a plurality of second images with a third time interval as an image capturing period thereof. As aforementioned, the image processor 13 processes the first images and the second images obtained in the second time interval using the recognition model to obtain first estimated quantities and second estimated quantities respectively, wherein the second time interval is at least twice as long as the first time interval, and also at least twice as long as the third time interval. For example, the first time interval is equal to the third time interval. Afterwards, the image processor 13 respectively calculates the average of the first estimated quantities and the average of the second estimated quantities, and selects the larger one to be the determined quantity.

In this embodiment, the image-capturing and target-counting device 1" can also comprise one or more of the rotary base 14, the signal transceiver 15 and the user interface 16 as mentioned in the previous embodiment, and their functions and the connections therebetween are not repeated herein. Moreover, in this embodiment, the image-capturing and target-counting device 1" comprising two cameras is exemplified. However, in another embodiment, the image-capturing and target-counting device can comprise more than two cameras and determine the quantity of the target items by the aforementioned method.

In view of the above description, the image-capturing and target-counting device provided in this disclosure may avoid the frequent updates on the determined quantity or a great quantity of the records of the determined quantities due to the frequent changes in the quantity of the target items by the settings of the image capturing period and the image processing and recording period, so that the loading of the image processing and the storage space of the device occupied by the records may be reduced. Moreover, the accuracy of the determined quantity (counting result) may be improved by synthesizing multiple images and processing the synthesized image to obtain the determined quantity.

What is claimed is:

1. An image-capturing and target-counting device, comprising:
   a camera;
   a controller, electrically connected to the camera, and controlling the camera to perform filming to obtain a plurality of images with a first time interval as an image capturing period; and
   an image processor, electrically connected to the camera, obtaining a plurality of estimated quantities according to a recognition model and a part of the plurality of images which is obtained in a second time interval, and obtaining and recording a determined quantity of a kind of target items existing in a filming field of the camera according to the plurality of estimated quantities, wherein the second time interval is at least twice as long as the first time interval; and
   a second camera, electrically connected to the controller and the image processor and controlled by the controller to perform filming to obtain a plurality of second images with a third time interval as an image capturing period thereof, wherein the image processor further obtains a plurality of second estimated quantities according to the recognition model and a part of the plurality of second images which is obtained in the second time interval and selects a larger one of an average of the plurality of estimated quantities and an average of the plurality of second estimated quantities to be the determined quantity, and the second time interval is at least twice as long as the third time interval.

2. The image-capturing and target-counting device according to claim 1, further comprising a rotary base electrically connected to and controlled by the controller for rotating, wherein the camera is disposed at the rotary base and configured to capture a plurality of sub-images respectively towards a plurality of directions, and the image processor is further configured to synthesize the plurality of sub-images to generate one of the plurality of images according to a weighting function.

3. The image-capturing and target-counting device according to claim 2, wherein the plurality of directions respectively corresponds to a plurality of rotating angles, and the weighting function indicates a Gauss distribution for the plurality of rotating angles.

4. The image-capturing and target-counting device according to claim 1, further comprising a signal transceiver electrically connected to the controller and outputting a notification signal related to the determined quantity according to a control command.

5. The image-capturing and target-counting device according to claim 4, wherein the controller further generates the control command when the image processor records the determined quantity.

6. The image-capturing and target-counting device according to claim 4, wherein the controller further generates the control command when determining that the determined quantity is equal to or larger than a threshold value.

7. The image-capturing and target-counting device according to claim 4, further comprising a user interface electrically connected to the controller and configured to generate the command.

8. The image-capturing and target-counting device according to claim 1, further comprising a user interface electrically connected to the controller and the image processor and configured to input one or more of the first time interval, the second time interval and the recognition model.

9. The image-capturing and target-counting device according to claim 1, wherein the recognition model belongs to a convolutional neural network (CNN) or a deep neural network (DNN).

* * * * *